United States Patent [19]

Martino

[11] 4,455,592

[45] Jun. 19, 1984

[54] HIGH INTENSITY ILLUMINATION LIGHT TABLE WITH ATTENUATING MEANS COUPLED TO RHOMBOID ARMS

[75] Inventor: Ronald J. Martino, Geneva, N.Y.

[73] Assignee: Bausch & Lomb Incorporated, Rochester, N.Y.

[21] Appl. No.: 477,046

[22] Filed: Mar. 21, 1983

[51] Int. Cl.³ .................... G09F 13/04; G02B 21/06
[52] U.S. Cl. ........................................ 362/97; 362/33; 362/282; 362/300; 362/302; 362/307; 362/311; 362/346; 362/347; 362/355; 362/375; 350/DIG. 3; 350/523
[58] Field of Search ................ 350/DIG. 3, 315, 517, 350/523, 528, 532, 520, 318, 515; 362/97, 398, 347, 355, 33, 283, 282, 307, 311, 346, 302, 300, 375

[56] References Cited

U.S. PATENT DOCUMENTS

| | | | |
|---|---|---|---|
| 883,868 | 4/1908 | Ford | 350/523 |
| 3,062,100 | 11/1962 | Ludewig et al. | 350/DIG. 3 X |
| 4,106,851 | 8/1978 | Considine et al. | 362/234 X |
| 4,220,982 | 9/1980 | Martino | 362/97 |
| 4,292,663 | 9/1981 | Martino et al. | 362/297 X |
| 4,363,532 | 12/1982 | Weber | 350/523 |

Primary Examiner—Donald G. Kelly
Assistant Examiner—John S. Maples
Attorney, Agent, or Firm—Bernard D. Bogdon; DeWitt M. Morgan; John S. Norton

[57] ABSTRACT

A high intensity light table, for use with a stereomicroscope having movable rhomboid arms, has an illumination source and a reflector. The table also includes light diffusing members which are rotatably mounted thereto. The diffusing members have: (1) magnets affixed thereto which are responsive to movement of the rhomboid arms of the instrument; and (2) means therein for selectively passing a beam of high intensity illumination.

7 Claims, 5 Drawing Figures

HIGH INTENSITY ILLUMINATION LIGHT TABLE WITH ATTENUATING MEANS COUPLED TO RHOMBOID ARMS

CROSS-REFERENCE TO RELATED APPLICATION

This application is related to concurrently filed and copending application Ser. No. 477,050, entitled "High Intensity Illumination Light Table" for inventors R. Martino and A. Shawcross.

DESCRIPTION OF THE PRIOR ART

The viewing of stereo photographs produced by aerial photography may be done with stereomicroscope optical systems and high intensity illumination light tables such as illustrated in U.S. Pat Nos. 4,220,982 and 4,292,663. The stereomicroscope includes a pair of rhomboid arms which are selectively positionable over the film being analyzed. The light table includes a parabolic reflector positioned about a light source and which reflects light up through the film support surface of the light table. The light provided sufficiently transilluminates the film being viewed to enable detailed analysis. The intensity of illumination required to enable such film analysis is, in many instances, over 100,000 ft-lamberts. Although the illumination provided is directional and not scattered, it ca be most irritating to the operator when working close to the viewing stage. Consequently, viewing the intense light output many times will result in operator eye fatigue. Frequently, the operator must back away from the intense light being emitted by the table. Accordingly, little productive work will be accomplished during this period of time.

A further light table illumination device includes a condenser type illuminator which is mounted below the glass surface of the light table. The condenser is connected via a fiber optic bundle which carries light from a source remote. The condenser is moved by magnets which are fixed to the stereomicroscope rhomboid arms.

The illumination system of the present invention provides a solution to the problem set forth above by providing diffusing discs which mimic rotation of the rhomboid arms of the instrument. The discs effectively diffuse unwanted illumination while permitting highly intense transillumination of selected areas of the film being reviewed.

SUMMARY OF THE INVENTION

A high intensity light table for transilluminating film includes a housing having a light transmitting surface. A light source is mounted in the housing below the light transmitting surface and includes a reflector to reflect light from the source through the transmitting surface. At least one light diffusing member is rotatably mounted to the housing adjacent the light transmitting surface. In the preferred embodiment the diffusing member has an aperture therein which permits undiffused light to pass therethrough. The rotatable diffusing member and the rhomboid arm of the stereomicroscope used for viewing the film are magnetically coupled such that rotation of the rhomboid arm thereof produces a corresponding rotation of the diffusing member.

DETAILED DESCRIPTION OF THE INVENTION

Figure 1:
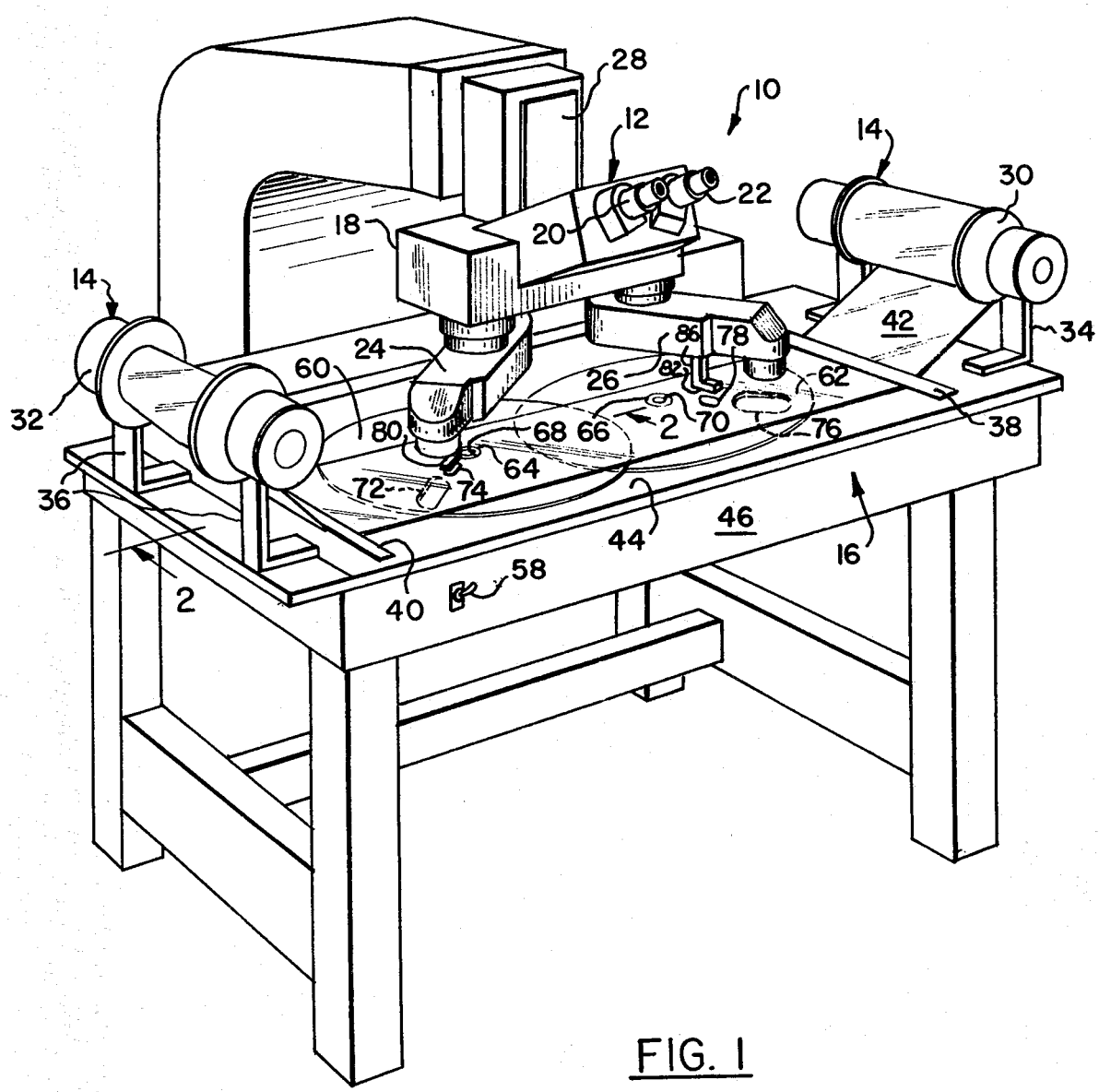
FIG. 1 is a perspective view of the high intensity illumination light table of the present invention.

A stereo viewing system 10 for viewing film taken by aerial photography includes a stereomicroscope 12, a film support and advance system 14 and a high intensity illumination light table 16.

The stereomicroscope 12 includes a structure 18 which has a pair of eyepieces 20 and 22 rotatably mounted thereto to enable, as is well known in the art, the interpupillary distance to be varied. Structure 18 further has rhomboid arms 24 and 26 which are also rotatably mounted thereto. The structure 18 is adjustably mounted to vertical support 28 so as to be movable relative to the light table 16 thereby accomplishing focusing of the stereomicrsocope optical system (not shown).

The film support and advance system 14 includes a film supply sprocket 30 and a film takeup sprocket 32 which are mounted to, respectively, support brackets 34 and 36. The brackets 34 and 36 are in turn slidably mounted to the light table 16 by any conventional well known manner (not shown). A pair of hold down members 38 and 40 are mounted to the light table 16 for retaining and positioning film 42 in the scanning stage 44.

Figure 2:
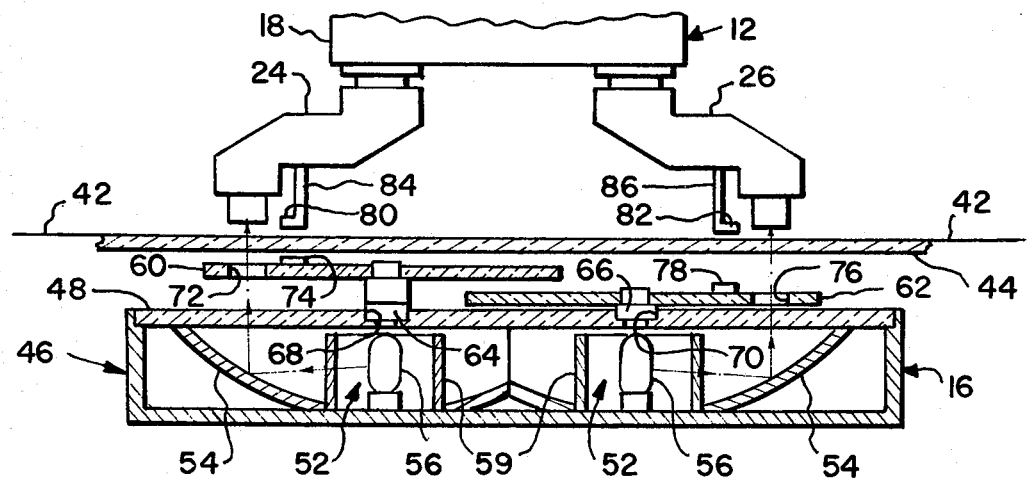
FIG. 2 is a partial section view in schematic taken along line 2—2 of FIG. 1.

The light table 16, as best seen in FIG. 2, includes a housing 46 having a cover plate 48, constructed of clear glass. A pair of illuminating systems 52 are enclosed within the housing 46. Each illuminating system 52 has a parabolic reflector 54 in which a quartz halogen tungsten lamp 56 is fitted to electrically energizable socket 58. The lamp 56 is preferably situated at the center of focus of the reflector 54. Power to lamp 56 may be controlled through control switch 58, as best seen in FIG. 1.

A pair of diffusing discs 60 and 62 are rotatably mounted via shouldered bearings 64 and 66 which are received in suitable bores 68 and 70 in cover plate 48, as illustrated in FIG. 2. The discs 60 and 62 are made either from a material which will pass, approximately, 4% of the light from reflector 54, or are coated with a suitable material to obtain the proper percentage of light transmission. As parabolic reflectors 54 are siamized together in the manner illustrated in the previously mentioned U.S. Pat. Nos. 4,220,982 and 4,292,663, the rotating diffusing discs 60 and 62 must be mounted so that they overlap each other, as best seen in FIG. 2. This may be easily accomplished by using a bearing spacer to raise one diffusing disc a distance sufficient to allow the other disc to fit partially below it.

Diffusing disc 60 has an aperture 72 and disc magnet 74 while diffusing disc 62 has a similar aperture 76 and disc magnet 78. The disc magnets 74 and 78 are, as illustrated in FIGS. 1 and 2, mounted in juxtaposition to the apertures 72 and 76. Rhomboid arms 24 and 26 have disc magnets 80 and 82 which are complimentary to disc magnets 74 and 80. They are affixed, respectively, to extensions 84 and 86. The magnetic attraction between the magnets on the rotating diffusing discs and the complimenting magnets on the rhomboid arms is such that rotation of either of the rhomboid arms causes a similar rotation in the corresponding diffusing disc.

In operation, with the film 42 disposed across the scanning stage 44 and the lamps 56 energized by switch 58, rhomboid arm 24, for instance, would be initially positioned over the aperture 72 of corresponding diffusing disc 60. A portion of the light reflected by the parabolic reflector 54 would pass directly through disc aperture 72 and into the objective lens of rhomboid arm 24 thereby illuminating that portion of film positioned in the light path. The remainder of the light reflected by the parabolic reflectors 54 would be substantially diffused by the diffusing discs 60 and 62 such that it is not discomforting to the operator.

Once the area being viewed under rhomboid arm 24 has been properly determined, as described above, the other rhomboid arm 26 would be rotated to find the corresponding exposed area of film to complete the stereo analysis. The magnetic attraction between the rhomboid arm and the diffusing disc provides the same alignment between aperture and objective as was described hereinabove for initial alignment of the first rhomboid arm. The operator may, therefore, look directly at the film 42 supported on the scanning stage 44 without being exposed to a rather large area of very intense light, which may approach 200,000 ft.-lamberts as set forth in the previously mentioned U.S. Pat. Nos. 4,220,982 and 4,292,663. The only intense light to which the operator is exposed is directed through the small disc apertures 72 and 76.

Figure 3:
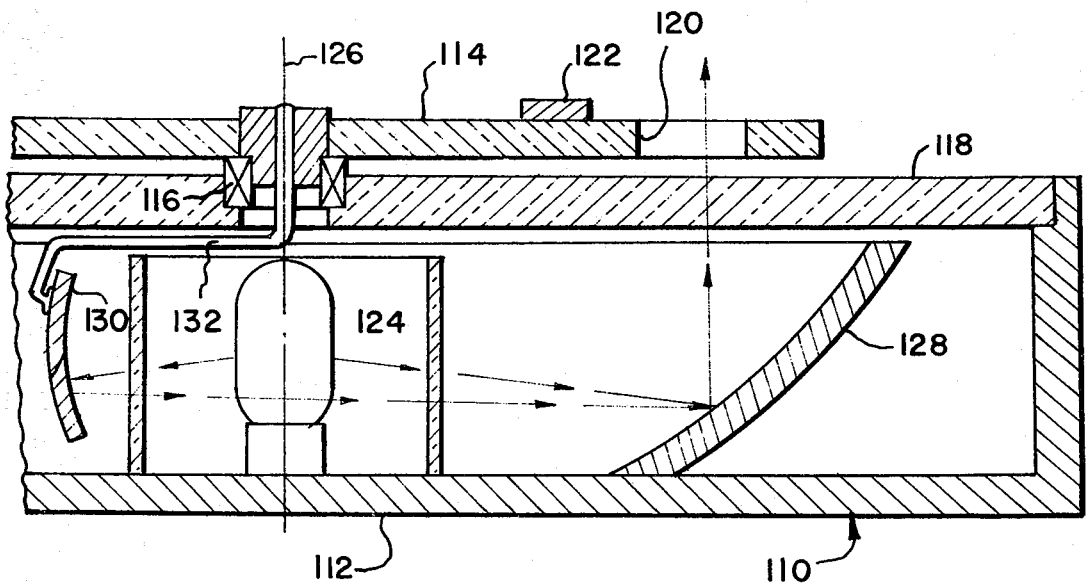
FIGS. 3–5 are enlarged partial section views similar to FIG. 2 showing alternative embodiments of the light table.

In the embodiment shown in FIG. 3 a light table 110, similar to the light table just described, includes a housing 112 which has a diffuser disc 114 rotatably mounted by bearing assembly 116 to clear glass support 118. The diffuser disc 114 has an aperture 120 and a magnet 122. A source of illumination, such as lamp 124, is positioned in the housing 112 in alignment with the axis of rotation 126 of the diffuser disc 114. A parabolic reflector 128 is fitted about the lamp 122. Additionally, a spherical reflector 130 is connected by linkage 132 to, for instance, diffuser disc 114 through bearing assembly 116 so as to be rotatable about lamp 124 when diffuser disc 114 is rotated by magnetic attraction between magnet 122 and magnetic means on the rhomboid arm (not shown) as previously described.

Illumination from lamp 124 is reflected by parabolic reflector 128 through glass support 118 where the greater portion is diffused by disc 114. However, a portion of it does pass undiffused through disc aperture 120. Auxilliary spherical reflector 130, which rotates with the diffusing disc 114 as described above, reflects a portion of illumination from lamp 124 back through the disc aperture 120. The illumination level through the disc aperture 120, and correspondingly, the film, can thereby be significantly increased.

Figure 4:
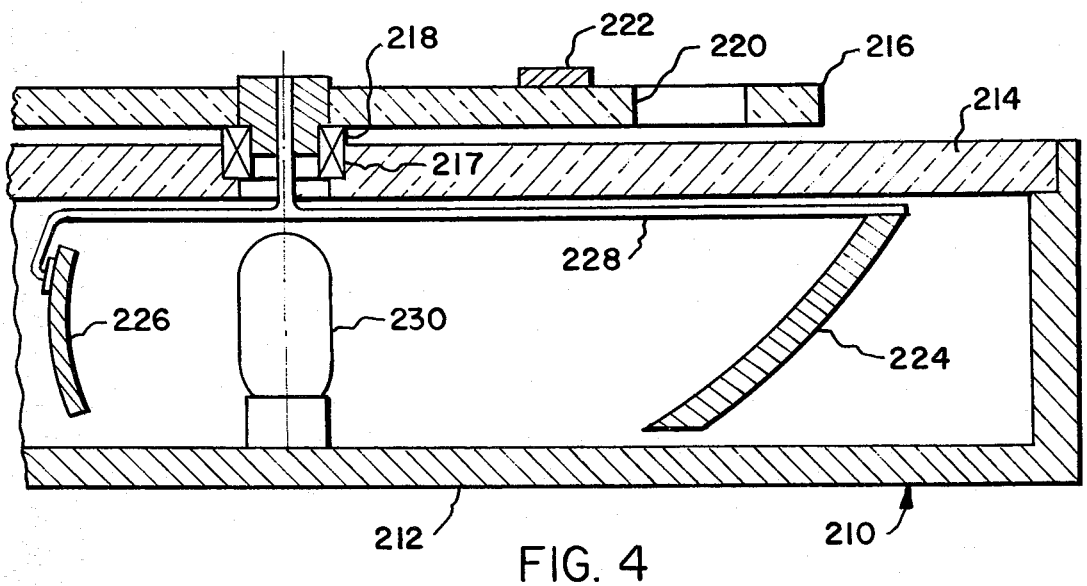

In a further embodiment shown in FIG. 4, a light table 210 includes a housing 212 which has a glass support 214. A diffuser disc 216 is rotatably mounted in bore 217 of glass support 214 via bearing assembly 218. The diffuser disc 216 has an aperture 220 and a magnet 222. A pair of reflectors, 224 and 226, are connected to diffuser disc 216 on opposite sides of lamp 230 by linkage 228. Reflector 224 may be either a portion of a parabola or an ellipse, while reflector 226 is preferably spherical.

The previously described magnetic attraction between the rhomboid arm (not shown) and magnet 222 causes the disc 216 to rotate when the rhomboid arm is rotated. As the reflectors 224 and 226 are connected to diffuser disc 216 via linkage 228, they are also caused to rotate. Spherical reflector 226 reflects additional light from lamp 230 to reflector 224 and through diffuser disc aperture 220. The light available to the stereomicroscope optics is thereby significantly increased. As there is no stationary reflecting surface, such as in the above and other known devices, illumination not reflected by reflectors 224 and 226 is harmlessly scattered about in the housing 212.

Figure 5:
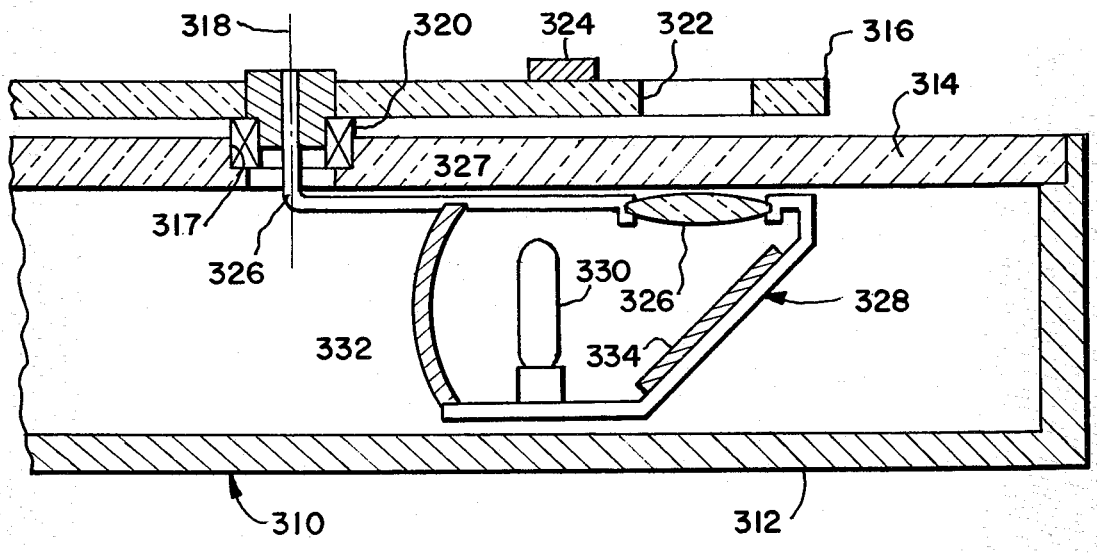

A still further embodiment is shown in FIG. 5 wherein a light table 310 includes a housing 312 and a clear glass support 314. A diffuser disc 316, rotatable about axis 318, is mounted in bore 317 of support 314 by bearing assembly 320. Like the previous embodiments, diffuser disc 316 has an aperture 322 and a magnet 324. A crank arm 326 is connected through aperture 327 of support 314 and bearing assembly 320 to diffuser disc 316. The crank arm 326 has a support beam 328 which carries in cantilever fashion lamp 330, spherical reflector 332, inclined mirror 334 and condenser lens 336. Illumination from lamp 330 is reflected by inclined mirror 334 through condenser lens 336, support 314 and disc aperture 322 to the stereomicroscope optics. Additional illumination from lamp 330 is reflected back by spherical reflector 332 to mirror 334 where it is directed through condenser lens 336 and, ultimately, to the stereomicroscope optics. A spot of high intensity illumination is thereby provided. It is evident that, as previously described in other embodiments, rotation of the rhomboid arm causes rotation of the diffuser disc 316 which, in turn, rotates the crank arm 326 and associated lamp, reflectors and lens. A stop mechanism (not shown) would be employed to prevent wind-up of the electrical wires attached to the lamp 330.

In any of the above-described embodiments, it is evident that a plurality of fluorescent lamps (not shown) may be mounted in the housing to provide background illumination. Also, a diffusing cylinder may be placed between the lamp and the reflector to elminate unwanted imaging in the stereomicroscope.

The drawings and accompanying text have shown and described several embodiments of my present invention. However, it should be readily appreciated by those skilled in the art that various changes may be made thereto without departing either from the spirit or scope of the invention.

I claim:

1. A high intensity light table for transilluminating film for viewing with microscope optics supported by rhomboid arms, said light table comprising:
   (a) a housing having a light transmitting surface;
   (b) illuminator means positioned in said housing for providing high intensity illumination;
   (c) reflector means disposed in said housing relative to said illuminator means such that when said illuminator means is energized said high intensity illumination is transmitted to said light transmitting surface;
   (d) means rotatably mounted to said housing between said light transmitting surface and said illuminator for at least partially attenuating said illumination, said attenuating means including means therein for passing unattenuated at least a portion of said high intensity light; and;

(e) means secured to said attenuating means responsive to movement of said rhomboid arms, whereby rotation of said rhomboid arms produces a corresponding rotation of said attenuating means said means for passing at least a portion of the beam of high intensity illumination.

2. The high intensity light table as set forth in claim 1, wherein said attenuating means comprises at least one disc, said disc having a diameter sufficient to encompass said said high intensity illumination from reflector means.

3. The high intensity light table as set forth in claim 2, wherein said means in said at least one diffusing disc for selectively passing unattenuated reflected light comprises an aperture.

4. The high intensity light table as set forth in claim 2, wherein said attenuating means includes two discs which are rotatably mounted in an overlapping fashion to each other.

5. The high intensity light table as set forth in claim 2, wherein said disc is a light diffusing disc.

6. The high intensity light table as set forth in claim 2, wherein said disc is opaque.

7. The high intensity light table as set forth in claim 3, wherein said means responsive to movement of said rhomboid arms comprises magnets mounted to at least one of said rhomboid arms and said discs.

* * * * *

UNITED STATES PATENT AND TRADEMARK OFFICE
CERTIFICATE OF CORRECTION

PATENT NO. : 4,455,592
DATED : June 19, 1984
INVENTOR(S) : Ronald J. Martino

It is certified that error appears in the above-identified patent and that said Letters Patent are hereby corrected as shown below:

Column 1, line 30, please change "ca" to --can--;
Column 5, line  4, after "means" insert --and--; and
         line 11, delete "said" (second occurrence).

Signed and Sealed this

Fifth Day of February 1985

[SEAL]

*Attest:*

DONALD J. QUIGG

*Attesting Officer*   *Acting Commissioner of Patents and Trademarks*